United States Patent
Hu et al.

(10) Patent No.: US 10,519,766 B2
(45) Date of Patent: Dec. 31, 2019

(54) RESERVOIR MODELLING WITH MULTIPLE POINT STATISTICS FROM A NON-STATIONARY TRAINING IMAGE

(75) Inventors: Lin Ying Hu, Katy, TX (US); Yongshe Liu, Katy, TX (US)

(73) Assignee: ConocoPhillips Company, Houston, TX (US)

(*) Notice: Subject to any disclaimer, the term of this patent is extended or adjusted under 35 U.S.C. 154(b) by 1546 days.

(21) Appl. No.: 13/551,801

(22) Filed: Jul. 18, 2012

(65) Prior Publication Data

US 2013/0110484 A1    May 2, 2013

Related U.S. Application Data

(60) Provisional application No. 61/551,708, filed on Oct. 26, 2011.

(51) Int. Cl.
*E21B 49/00*    (2006.01)
*G01V 99/00*    (2009.01)
*G06T 17/05*    (2011.01)

(52) U.S. Cl.
CPC .................................. *E21B 49/00* (2013.01)

(58) Field of Classification Search
None
See application file for complete search history.

(56) References Cited

U.S. PATENT DOCUMENTS

| | | | |
|---|---|---|---|
| 7,079,953 B2 | 7/2006 | Thorne | |
| 7,516,055 B2 | 4/2009 | Strebelle | |
| 7,558,708 B2 | 7/2009 | Le Ravalec-Dupin et al. | |
| 7,630,517 B2 | 12/2009 | Mirowski et al. | |

(Continued)

FOREIGN PATENT DOCUMENTS

| | | |
|---|---|---|
| WO | WO2009138290 | 5/2008 |
| WO | WO20100057505 | 11/2008 |

OTHER PUBLICATIONS

Jafarpour et al., "A Probability Conditioning Method (PCM) for Nonlinear Flow Data Integration into Multipoint Statistical Facies Simulation", Math Geosci, vol. 43, Feb. 2011, pp. 133-164.*

(Continued)

*Primary Examiner* — Rehana Perveen
*Assistant Examiner* — Steven W Crabb
(74) *Attorney, Agent, or Firm* — Boulware & Valoir

(57) ABSTRACT

A multiple point simulation technique for generating a model realization of a subterranean formation having different facies is described which uses a non-stationary training image which reflects facies spatial trends across the formation. The realization is formed by sequentially populating each cell; a facies pattern of neighboring cells is identified for each cell in the model grid, and then corresponding facies patterns identified in the training image. The probability of a target cell in the model grid having a given facies is calculated based on the proportion of occurrences of the corresponding facies pattern where the central cell has that facies. The contribution of each corresponding facies pattern occurrence in the training image to this proportion or probability is weighted according to the distance between its central cell and the training image cell corresponding in location to the target cell in the model grid.

4 Claims, 3 Drawing Sheets

(56) References Cited

U.S. PATENT DOCUMENTS

| | | | |
|---|---|---|---|
| 8,682,624 B2* | 3/2014 | Mariethoz | G01V 11/00 703/10 |
| 2006/0041409 A1 | 2/2006 | Strebelle | |
| 2010/0272324 A1 | 10/2010 | Hu | |
| 2011/0004447 A1 | 1/2011 | Hurley | |

OTHER PUBLICATIONS

Strebelle, S., "Sequential simulation drawing structures from training images," Ph.D. Thesis, Stanford Univ., Stanford, CA (Year: 2000).*

Strebelle and Levy, "Using multiple-point statistics to build geologically realistic reservoir models: the MPS/FDM workflow." Geological Society, London, Special Publications 309:67-74 (2008).

Larriestra and Gomez, "Multiple-Point Simulation Applied to Uncertainty Analysis of Reservoirs Related to High Sinuosity Fluvial Systems: Mina El Carmen Formation, San Jorge Gulf Basin, Argentina" Search and Discovery Article #40515 (2010).

Michael, "Combining Process Models and Geostatistics: Conditional Simulation of Realistic Geologic Heterogeneity."

Chugunova, T. and Hu, L.Y. (2008), "Multiple-point simulations constrained by continuous auxiliary data", Math. Geosci., 40(2), 133-14.

Hu, L.Y. and Chugunova, T. (2008), Multiple-point geostatistics for modeling subsurface heterogeneity: A comprehensive review, Water Resour. Res., 44, W11413, doi: 10.1029/2008WR006993.

Guardiano, B. F., and Srivastava, M.R., "Multivariate geostatistics: Beyond bivariate moments," Geostatistics Tróia '92: Springer, vol. 1, pp. 133-144 (Jan. 1993) (Abstract).

Strebelle, S., "Sequential simulation drawing structures from training images," Ph.D. Thesis, Stanford Univ., Stanford, California (2000).

Strebelle, S., and Zhang, T., "Non-stationary multiple-point geostatistical models," Geostatistics Banff 2004; Springer, pp. 235-244 (Jan. 2005) (Abstract).

* cited by examiner

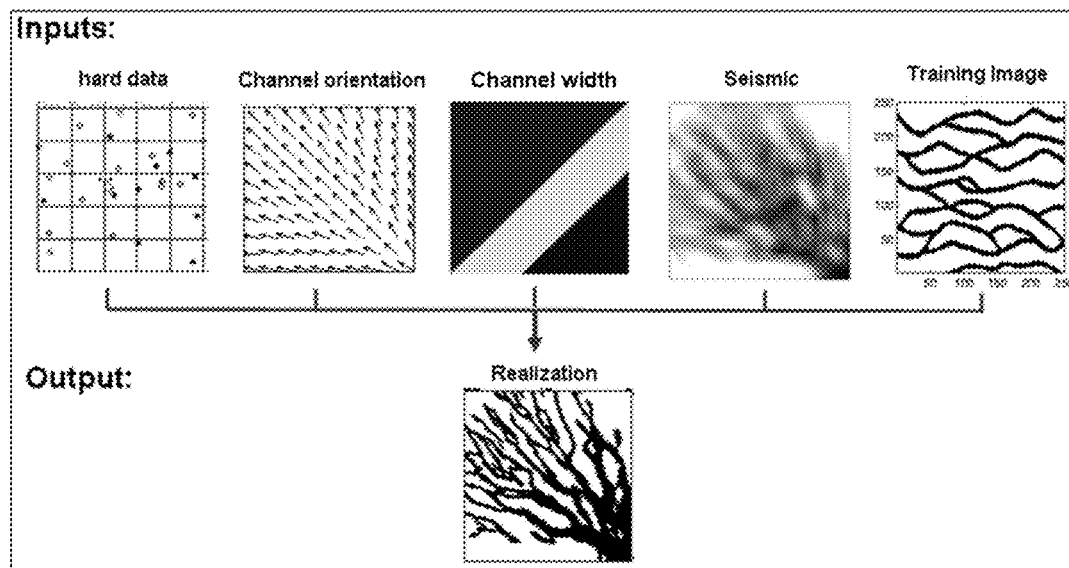
Figure 1    (PRIOR ART)
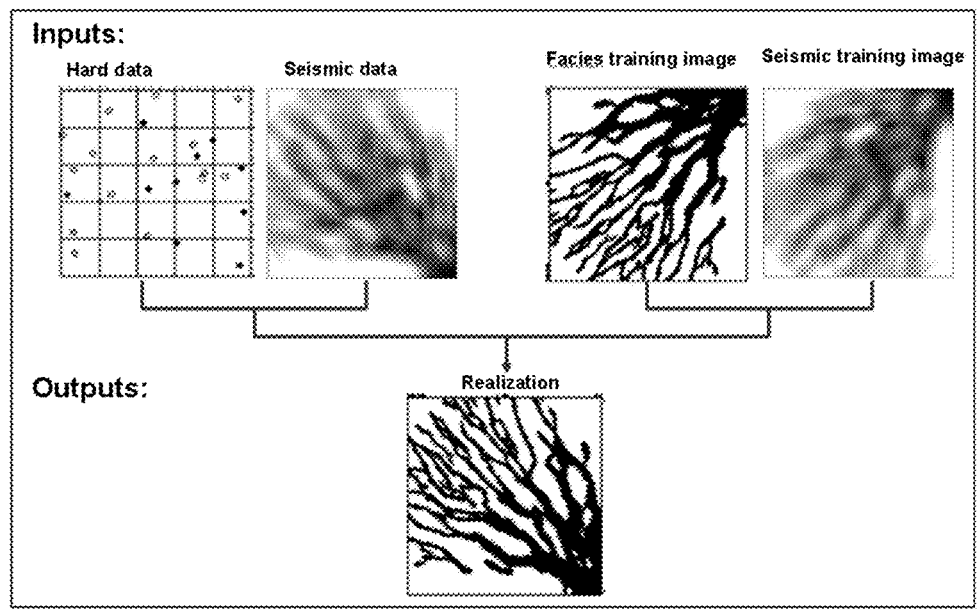
Figure 2    (PRIOR ART)

RESERVOIR MODELLING WITH MULTIPLE POINT STATISTICS FROM A NON-STATIONARY TRAINING IMAGE

CROSS-REFERENCE TO RELATED APPLICATIONS

This application is a non-provisional application which claims benefit under 35 USC § 119(e) to U.S. Provisional Application Ser. No. 61/551,708 filed Oct. 26, 2011, entitled "RESERVOIR MODELLING WITH MULTIPLE POINT STATISTICS FROM A NON-STATIONARY TRAINING IMAGE," which is incorporated herein in its entirety.

STATEMENT REGARDING FEDERALLY SPONSORED RESEARCH OR DEVELOPMENT

None.

FIELD OF THE INVENTION

This invention relates to the mathematical modeling of three dimensional regions, such as subterranean hydrocarbon reservoirs, using the stochastic technique known as multiple point statistics (MPS).

BACKGROUND OF THE INVENTION

For half a century, geostatistical methods have been increasingly used in the petroleum industry for modeling geological and petrophysical heterogeneities of hydrocarbon reservoirs. Traditional geostatistical methods are based on random function models that are defined to mimic the internal geological architecture of the hydrocarbon reservoir of interest. However, in some cases, for example a meandering channel system, random function based methods are either not suitable to capture the complexity of the geological patterns/features, or not flexible enough for data conditioning.

In the last two decades, multiple-point (MP) geostatistics has been developed and increasingly used for modeling subsurface heterogeneity (Guardiano and Srivastava, 1993; Strebelle, 2000; Hu and Chugunova, 2008). Unlike traditional geostatistical simulations based on random function models, a MP geostatistical simulation does not require the explicit definition of a random function. Instead, it directly utilizes empirical multivariate distributions inferred from one or more training images (TI's). This approach is flexible to data conditioning and to representing complex architectures of geological facies and petrophysical properties.

In general, training images should represent the spatial distribution of the geometrical patterns/features of the reservoir heterogeneity. However, current MPS algorithms require the training images to be spatially stationary. This means that the training image, being stationary, bears no information about the location of the geometrical patterns/features of heterogeneity in either the reservoir itself or in a model realization. Instead, the stationary TI provides a population of cells having certain characteristics, such as a meandering channel system with channel width, thickness and degree of meandering. The statistical distribution of the characteristics is intended to reflect the statistical distribution of those characteristics in the reservoir which is being modeled, but without reference to location. The TI need not have the same dimensions as the model and often has fewer cells in the vertical axis but more cells in the horizontal axes than the model. The stationary TI is actually far from being a reservoir model.

However, real geological patterns often present spatial trends and are thus not stationary in the sense described above. Normally, a geologist or a geomodeller will need to create a TI prior to a model being created. Creating a realistic, but stationary TI is a contradictory task for geologists and geomodellers, simply because a realistic TI cannot be stationary in most real situations.

Methods have been developed to integrate spatial trends into MPS realizations (see, e.g. Strebelle and Zhang, 2005), but these method still use stationary TI's.

Chugunova and Hu (2008) describe a MPS method with non-stationary training images. In their method, coupled primary and secondary training images are used to infer the conditional probability of the primary variable given a primary pattern and a secondary datum. This method can be applied to the case where a secondary data set (e.g., from seismic) is available for constraining the spatial distribution of geological patterns. Although realistic MPS models are constructed by using this method, the basic algorithm remains heuristic. It also requires building a secondary training image from the primary training image in consistency with the secondary data. Besides, the non-stationary TI's of the above MPS method do not necessarily reflect the location of the geometrical patterns/features of the reservoir heterogeneity. Therefore, they are also far from being a reservoir model.

BRIEF SUMMARY OF THE DISCLOSURE

The inventors have developed a new MPS algorithm for building conditional MPS realizations from a geologically realistic TI without the stationarity assumption and without the requirement of a coupled secondary TI. This new algorithm is mathematically well founded. It allows MPS realizations to be built directly using geologically realistic TI's.

A geologically realistic training image may be built, for example, using geological process-based modeling. This TI is not necessarily stationary, thus may be representative of the spatial trend of reservoir geological patterns. This process-based model can be considered as a training image because it is not necessarily conditioned to any local data from wells. But it can also be considered as a pseudo reservoir model because it has the same size and presents the same spatial trend of the reservoir model. In general, it is specific to each reservoir and makes much more sense to geologists than a stationary training image.

One embodiment of the invention is a multiple point statistics method of generating a model realization of a subterranean formation having different facies, the method comprising sequentially populating cells in a simulation grid, wherein the method comprises the steps of:
  (a) creating a training image representative of geometric patterns and/or features of said different facies and their spatial distribution in the formation, the training image comprising a plurality of TI cells and having equivalent dimensions to said model realization;
  (b) for a target cell in the simulation grid to be populated (that is to say, informed with data), identifying a facies pattern of neighboring cells in the simulation grid and then identifying occurrences of a corresponding facies pattern of neighboring TI cells in the training image;
  (c) assigning a weighting factor to each said corresponding facies pattern occurrence, the weighting factor reflecting the distance of the respective facies pattern occurrence from a TI cell corresponding in location to said target cell;

(d) from steps (b) and (c) calculating a probability of the target cell having certain facies and, using said probability, assigning a facies to said target cell;

(e) repeating steps (b) to (d) and thereby generating said reservoir model realization by assigning a facies sequentially to further target cells of the simulation grid.

The term "simulation grid" means an unpopulated or partially populated grid of cells which, when fully populated with data, becomes a model realization.

The method may involve defining a path in the simulation grid for visiting the target cells sequentially. This path may be generated randomly or by some other means.

For some cells of the simulation grid, hard facies data e.g. from wells would normally be available. The path referred to above may not include cells for which there is hard data. Put another way, steps (b) and (c) may not be carried out for cells of the simulation grid which may be populated with hard facies data.

A neighborhood window may be defined, having the target cell at its center, and within which said identified facies pattern (step (b)) is located. In this case, any said corresponding facies pattern in the training image occurs within a neighborhood window of corresponding dimensions.

In each step (b), the entire training image may be scanned to identify corresponding facies pattern occurrences. Alternatively, in a further step prior to step (b), the training image may be scanned, e.g. with a predefined template such as the neighborhood window defined above, to create a search tree comprising a plurality of nodes. In this case, step (b) involves searching the search tree for nodes which are compatible with the said facies pattern of the simulation grid.

The training image may be a geologically realistic image, e.g. reflecting facies trends across the formation. The training image would not normally be conditioned to hard data from wells before application of a MPS method according to the invention. The training image may be created by process-based modeling, that is to say a modeling technique which mimics the physical process of sedimentation. In general, a process-based model can capture the trends in the spatial distribution of facies, but is not well suited to accommodating hard data.

The probability of step (d) may be defined as P(A|B,u) where:

A stands for the event of observing a certain facies at any location in the simulation grid, B stands for the event of observing a certain facies pattern in the neighborhood of any location in the simulation grid, and u stands for the event of being at a certain location u in the simulation grid, and wherein the calculation of the probability involves the calculation of probability density functions based on the location of events in the training image.

The probability of step (d) may be given by:

$$P(A\mid B, u) \approx \frac{\sum_{i=1}^{\#(A,B)} g_\sigma(u-u_i)}{\sum_{i=1}^{\#(B)} g_\sigma(u-u_i)}$$

where $g_\sigma(u-u_i)$ stands for a kernel pdf at location $u_i$ with parameter $\sigma$,

(B) stands for the number of occurrences of said corresponding facies pattern of neighboring cells, and

(A,B) stands for the number of occurrences of said corresponding facies pattern of neighboring cells for which the TI cell corresponding to the respective target cell has a given facies.

In another embodiment of the invention, a method of generating a MPS model realization having a number of simulation points may comprise:

(a) creating a training image having a number of grid nodes corresponding to said number of simulation points in the model;

(b) defining a path for visiting all said simulation points of the model except those with hard data;

(c) at each said simulation point u:
 i. identifying a data event B consisting of a facies pattern in a neighborhood surrounding said simulation point u;
 ii. identifying all grid nodes in said training image whose neighboring facies patterns are compatible with data event B;
 iii. computing a conditional probability $P(A_i|B,u)$ for all possible events $A_i$ at said simulation point u based on the number of said compatible grid nodes, weighted according to the distance between a respective compatible grid node and a grid node corresponding in location to the simulation point u;
 iv. drawing a facies for simulation point u according to the conditional probability distribution $P(A_i|B,u)$.

Step (iii) may employ the equation $$P(A\mid B, u) \approx \frac{\sum_{i=1}^{\#(A,B)} g_\sigma(u-u_i)}{\sum_{i=1}^{\#(B)} g_\sigma(u-u_i)}$$

with a predefined kernel function $g_\sigma(\bullet)$.

BRIEF DESCRIPTION OF THE DRAWINGS

A more complete understanding of the present invention and benefits thereof may be acquired by referring to the following description taken in conjunction with the accompanying drawings in which:

FIG. 1 is a diagrammatic representation of a known MPS method using a stationary training image;

FIG. 2 is a diagrammatic representation of a known MPS method using coupled primary and secondary training images;

DETAILED DESCRIPTION

Figure 3:
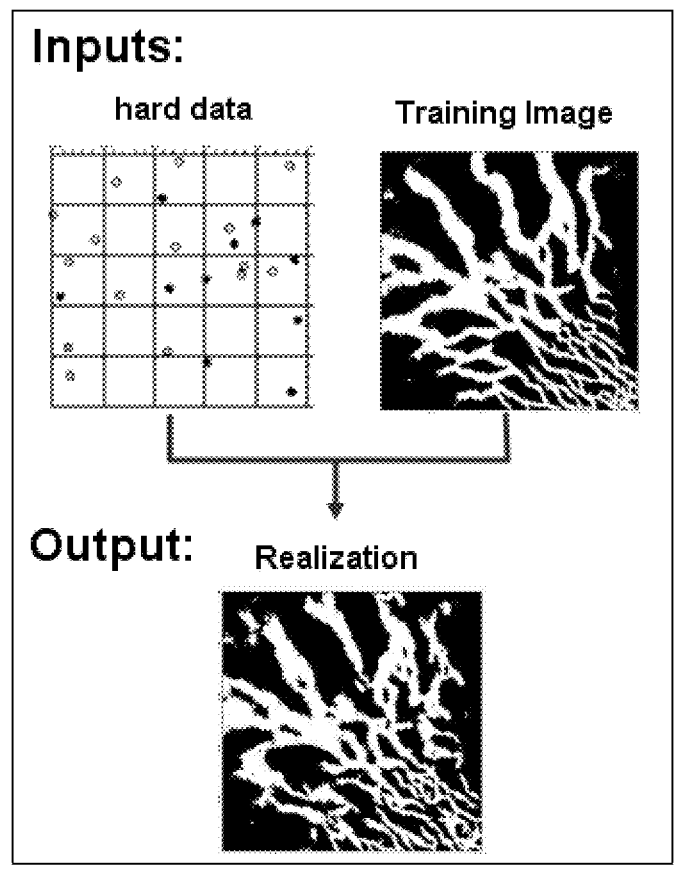
FIG. 3 is a diagrammatic representation of an MPS method in accordance with the invention.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Consider we have one or multiple training images built by process-based reservoir modeling. In general, patterns in a process-based reservoir model are non-stationary, in the sense that they are location dependent, constrained by depositional environment, seismic data or any other trend maps. The process-based training images are defined on the same simulation grid and they are not conditioned by hard data from wells.

Let A stand for the event of observing a certain facies (at any location of the simulation grid), B for the event of observing a certain facies pattern (in the neighborhood of any location of the simulation grid) and u for the event of being at a certain location u in the simulation grid. We want to determine, at a given location u and for a given data event B, the probability of observing event A: $P(A|B,u)$ In general, we can approximate this probability using empirical statistics of patterns in the training images:

$$P(A\mid B, u) \approx \frac{P(A, B, u)}{P(B, u)} \approx \frac{\#(A, B, u)}{\#(B, u)}$$

where $\#(B,u)$ stands for the number of replicates of event B at location u, and $\#(A,B,u)$ the number of replicates of event $(A,B)$ at location u. The above approximation of the conditional probability $P(A|B,u)$ is meaningful either in the case of multiple training images or in the case where we account for the replicates in a certain neighborhood of location u. The later case leads to the following more general and more practical kernel-based method.

The probability $P(A|B,u)$ can formally be expanded as follows:

$$P(A\mid B, u) = \frac{P(A, B, u)}{P(B, u)} = P(A\mid B)\frac{P(u\mid A, B)}{P(u\mid B)} = P(A\mid B)\frac{pdf(u\mid A, B)}{pdf(u\mid B)}$$

where $$P(A\mid B) \approx \frac{\#(A, B)}{\#(B)}$$

stands for the probability of event A given event B disregarding their locations in the training image, $$pdf(u\mid A, B) \approx \frac{1}{\#(A, B)}\sum_{i=1}^{\#(A,B)} g_\sigma(u - u_i)$$

stands for the probability density function (pdf) of the location of event $(A,B)$ and its kernel-based approximation using the replicates of event $(A,B)$ in the training image, and $$pdf(u\mid B) \approx \frac{1}{\#(B)}\sum_{i=1}^{\#(B)} g_\sigma(u - u_i)$$

stands for the probability density function (pdf) of the location of event B and its kernel-based approximation using the replicates of event B in the training image.

Using the above statistics from the training image, $P(A|B,u)$ is rewritten:

$$P(A\mid B, u) \approx \frac{\sum_{i=1}^{\#(A,B)} g_\sigma(u - u_i)}{\sum_{i=1}^{\#(B)} g_\sigma(u - u_i)} \quad (1)$$

where $g_\sigma(u-u_i)$ stands for a kernel pdf at location $u_i$ with parameter $\sigma$. Usually, $g_\sigma(u-u_i)$ is a decreasing function from $u_i$. For instance, it can be a Gaussian pdf with mean $u_i$ and standard deviation $\sigma$. But, it can also be another function chosen for each particular case. $g_\sigma(u-u_i)$ can be interpreted as a weight given to a pattern B or $(A,B)$ found at location $u_i$. The larger the distance between the pattern location $u_i$ and the simulation point u, the smaller the weight for the pattern is. This leads to non-stationary multiple point simulations. The magnitude of the non-stationarity is controlled by the parameter $\sigma$. With a small $\sigma$, we should expect simulations not much different from the training image. With a large $\sigma$, simulations should be stationary, even if the training image is non-stationary. $\sigma$ (more exactly $2\sigma$) is similar to the variogram range beyond which the weight becomes negligible.

The above algorithm for computing conditional probability for MPS with a non-stationary TI can be integrated into the existing MPS implementation that uses the search tree (a data structure) to store the multiple-point statistics from training images. The major steps of the implementation are as follows:
1. build the search tree:
    a) scan the training image with a predefined template
    b) store in each node of the search tree the following:
        a specific conditioning pattern (disregarding the central point)
        a vector of the corresponding central point events
        a vector of the corresponding central point locations
2. generate a MPS realization:
    a) define a path for visiting all simulation points (grid nodes) except those with hard data
    b) at each point u, identify the data event B, then search for all nodes in the search tree that are compatible with the data event B
    c) compute the conditional probability $P(A_i|B,u)$ for all possible events $A_i$ at the simulation point according to Eq. (1) with a predefined kernel function $g_\sigma(\bullet)$
    d) draw an event for point u according to the conditional probability distribution $P(A_i|B,u)$
    e) go to the next point of the simulation path until all points are simulated.

The method may also be associated with other MPS implementation algorithms such as multiple grids, secondary constraint, etc.

Example 1

In this example, an artificial, small, two dimensional non-stationary training image was created to testing purposes. A method in accordance with the invention was then used to create a non-conditioned MPS realization, that is to say a realization based on the training image only and not on any hard data.

Figure 4A:
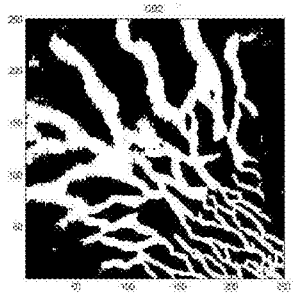
FIGS. 4a-4c are a diagrammatic representation of an example according to the invention showing, respectively, a training image, a non-conditional MPS realization, and the difference between the training image and the MPS realization.
Figure 4B:
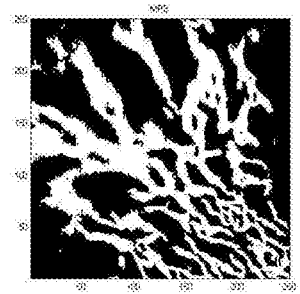
Figure 4C:
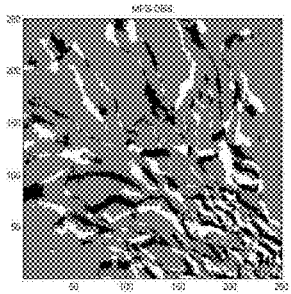

The realization was created using a 21×21 template, that is to say the neighborhood window measured 21 cells by 21 cells. The Gaussian kernel with parameters $\sigma_x=\sigma_y=5$ was used. FIG. 4a shows the training image, FIG. 4b shows the MPS realization. FIG. 4c shows the difference between the MPS realization and the training image. Since no hard data was used, the realization is simply an equally probable alternative version of the training image.

Example 2

Figure 5A:
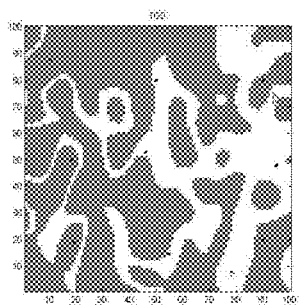
FIG. 5a-c is a diagrammatic representation of an example according to the invention showing, respectively, a training image, the conditional MPS realization, and the difference between the training image and the MPS realization.
Figure 5B:
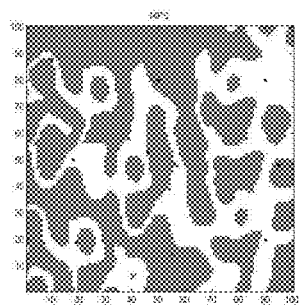
Figure 5C:
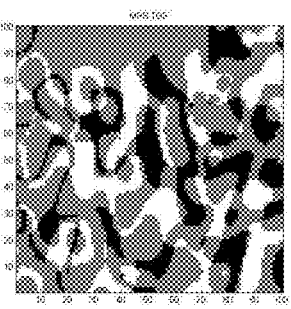

In this example, another small, artificial, two dimensional non-stationary training image was created, together with nine hard data points. In this example a 51×51 template was used and with a Gaussian kernel of parameter $\sigma_x=\sigma_y=5$. FIG. 5a shows the training image. FIG. 5b shows the MPS realization, conditioned to nine hard data. In both images, the hard data locations are shown by black dots; facies at these locations are the opposite of the facies of the corresponding cells in the training image. FIG. 5c shows the difference between the MPS realization and the training image.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. Guardiano, F. and Srivastava, M. (1993), Multivariate geostatistics: Beyond bivariate moments, in Geostatistics Troia'92, edited by A. Soares, pp. 133-144, Springer, Dordrecht, Netherlands.
2. Strebelle, S. (2000), Sequential simulation drawing structures from training images, Ph.D. thesis, Stanford Univ., Stanford, Calif.
3. Strebelle, S., and T. Zhang (2005), Non-stationary multiple-point geostatistical models, in Geostatistics Banff 2004, edited by O. Leuanthong, and C. V. Deutsch, pp. 235-244, Springer, Dordrecht, Netherlands.
4. Chugunova, T. and Hu, L. Y. (2008), Multiple-point simulations constrained by continuous auxiliary data, Math. Geosci., 40(2), 133-14
5. Hu, L. Y. and Chugunova, T. (2008), Multiple-point geostatistics for modeling subsurface heterogeneity: A comprehensive review, *Water Resour. Res.*, 44, W11413, doi: 10.1029/2008WR006993.

The invention claimed is:
1. A computer implemented method of generating a realistic model of a subterranean formation, the method comprising:
   (a) obtaining a training image of a subterranean formation having a number of grid nodes corresponding to a number of simulation points u in the model;
   (b) at each said simulation point u:
      (i) identifying a data event B consisting of a facies pattern in a neighborhood surrounding said simulation point u;
      (ii) identifying all grid nodes in said training image whose neighboring facies patterns are compatible with data event B;
      (iii) computing a conditional probability distribution $P(A_i|B,u)$ based on possible facies events $A_i$ at said simulation point u based on the number of said compatible grid nodes, weighted according to the distance between a respective compatible grid node and a grid node corresponding in location to the simulation point u;
      (iv) drawing a facies event for said simulation point u according to the conditional probability distribution $P(A_i|B,u)$; and
   (c) repeating step (b) for each next simulation point until all facies events for all simulation points u are drawn, thereby generating the realistic model of said subterranean formation.
2. The method of claim 1 wherein step (iii) employs the equation

$$P(A|B,u) \approx \frac{\sum_{i=1}^{\#(A,B)} g_\sigma(u-u_i)}{\sum_{i=1}^{\#(B)} g_\sigma(u-u_i)}$$

with a predefined kernel function $g_\sigma(\bullet)$, wherein #(B) stands for the number of occurrences of said corresponding facies pattern of neighboring cells, and #(A,B) stands for the number of occurrences of said corresponding facies pattern of neighboring cells for which a training image cell corresponding to a respective target cell has a given facies A.

3. A computer implemented multiple point statistics method of generating a model realization of a subterranean formation having different facies, the method comprising sequentially populating and drawing cells in a simulation grid, wherein the method comprises the steps of:
   (a) obtaining a training image representative of geometric patterns and/or features of said different facies and their spatial distribution in the subterranean formation, the training image comprising a plurality of training image cells and having equivalent dimensions to said model realization;
   (b) for a target cell in the simulation grid to be populated, identifying a facies pattern of neighboring cells in the simulation grid and then identifying occurrences of a corresponding facies pattern of neighboring training image cells in the training image;
   (c) assigning a weighting factor to each said corresponding facies pattern occurrence, the weighting factor reflecting the distance of the respective facies pattern occurrence from a training image cell corresponding in location to said target cell;

(d) calculating a probability of the target cell having certain facies from steps (b) and (c) and drawing said target cell, wherein said probability is defined as P(A|B,u) where: A stands for the event of observing a certain facies at any location in the simulation grid, B stands for the event of observing a certain facies pattern in the neighborhood of any location in the simulation grid, and u stands for the event of being at a certain location u in the simulation grid, and wherein the calculation of the probability involves the calculation of probability density functions based on the location of events in the training image;

(e) generating said model realization by repeating steps (b) to (d) sequentially until all target cells of the simulation grid are populated and drawn, wherein the model realization represents geological and petrophysical heterogeneities of a geological structure of the subterranean formation.

4. A computer implemented multiple point statistics method of generating a reservoir model realization of a subterranean formation having different facies, the method comprising sequentially populating cells in a simulation grid, wherein the method comprises the steps of:

(a) creating a training image representative of geometric patterns and/or features of said different facies and their spatial distribution in the subterranean formation, the training image comprising a plurality of training image cells and having equivalent dimensions to said model realization;

(b) for a target cell in the simulation grid to be populated, identifying a facies pattern B of neighboring cells in the simulation grid and then identifying occurrences of a corresponding facies pattern of neighboring training image cells in the training image;

(c) assigning a weighting factor to each said corresponding facies pattern occurrence, the weighting factor reflecting the distance of the respective facies pattern occurrence from a training image cell corresponding in location to said target cell;

(d) from steps (b) and (c) calculating a probability of the target cell having certain facies A at a given location u, wherein said probability is given by:

$$P(A \mid B, u) \approx \frac{\sum_{i=1}^{\#(A,B)} g_\sigma(u - u_i)}{\sum_{i=1}^{\#(B)} g_\sigma(u - u_i)}$$

where $g_\sigma(u-u_i)$ stands for a kernel pdf at location $u_i$ with parameter $\sigma$, \#(B) stands for the number of occurrences of said corresponding facies pattern of neighboring cells, and \#(A,B) stands for the number of occurrences of said corresponding facies pattern of neighboring cells;

(e) repeating steps (b) to (d) until each target cell in the simulation grid is populated; and (f) drawing each populated target cell thereby generating said reservoir model realization, wherein said reservoir model realization represents geological and petrophysical heterogeneities of a geological structure of the subterranean formation.

\* \* \* \* \*